(12) United States Patent
Itoh et al.

(10) Patent No.: US 6,627,169 B1
(45) Date of Patent: Sep. 30, 2003

(54) SILICON CARBIDE POWDER AND PRODUCTION METHOD THEREOF

(75) Inventors: Michio Itoh, Hachioji (JP); Shigeki Endo, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/576,217

(22) Filed: May 23, 2000

(30) Foreign Application Priority Data

Jun. 10, 1999 (JP) .......................................... 11-164013

(51) Int. Cl.[7] .............................................. C01B 31/36
(52) U.S. Cl. .......................................... 423/345; 501/88
(58) Field of Search ............................ 423/345; 501/88; 264/625, 670, 682

(56) References Cited

U.S. PATENT DOCUMENTS 5,589,116 A * 12/1996 Kojima et al. ............... 423/345
6,013,236 A * 1/2000 Takahashi et al. .......... 423/345

FOREIGN PATENT DOCUMENTS

| JP | A-61-6110 | 1/1986 |
|---|---|---|
| JP | A-5-24818 | 2/1993 |
| JP | A-10-67565 | 3/1998 |
| JP | A-11-106212 | 4/1999 |

* cited by examiner

Primary Examiner—Stuart L. Hendrickson
(74) Attorney, Agent, or Firm—Oliff & Berridge, PLC

(57) ABSTRACT

A high purity silicon carbide powder, a production method thereof, and a high purity silicon carbide sintered body are provided. The silicon carbide powder contains impurity elements, each of the impurity elements being contained in an amount of at most 0.01 ppm; the production method of silicon carbide powder includes a burning step, in which amounts of carbon monoxide generated during burning are detected and temperature adjustments are controlled in accordance with the detected amounts, and a heat treatment step, in which silicon carbide powder obtained in the burning step is heat-treated in a vacuum atmosphere; and the silicon carbide sintered body is formed by sintering silicon carbide powder.

20 Claims, No Drawings

SILICON CARBIDE POWDER AND PRODUCTION METHOD THEREOF

BACKGROUND OF THE INVENTION

1. Field of the Invention

The present invention relates to silicon carbide powder and a production method thereof, and specifically to silicon carbide powder which can provide a high purity, high density silicon carbide sintered body, and a production method thereof.

2. Description of the Related Art

Conventionally, holding jigs of semiconductor-related components such as wafers and the like have been made of quartz material. However, because wafer processing temperatures have increased and processing times have shortened, there have been problems with the quartz material being thermally deformed and being deteriorated by cleaning with chemicals such as hydrofluoric acid and the like. As a means for solving these problems, a silicon carbide sintered body whose strength at high temperature, heat resistance, wear resistance, chemical resistance and the like are excellent has been desired for use as a replacement material.

In order to use a silicon carbide sintered body for semiconductor-related components, purification is necessary. Silicon carbide sintered bodies have conventionally been produced by burning silicon carbide powder having impurities in amounts of at most 0.1 ppm. However, in the future, higher purification will of necessity be required. Thus, development of higher purity silicon carbide powder is required.

SUMMARY OF THE INVENTION

Accordingly, the present invention was achieved in view of the conventional problems above. An object of the present invention is to provide a high purity silicon carbide powder which is useful as a raw material for a high purity silicon carbide sintered body, a production method thereof, and the high purity silicon carbide sintered body.

A first aspect of the present invention is a silicon carbide powder, which contains impurity elements, each of the impurity elements being contained in an amount of not more than 0.01 ppm.

A second aspect of the present invention is a production method of a silicon carbide powder, the method comprising the steps of: burning a silicon-containing compound and a carbon-containing compound in an inert atmosphere; and heat-treating, in a vacuum atmosphere, a silicon carbide powder which is obtained from the burning step.

A third aspect of the present invention is a silicon carbide powder produced by a method comprising the steps of: burning a silicon-containing compound and a carbon-containing compound in an inert atmosphere; and heat-treating, in a vacuum atmosphere, a silicon carbide powder which is obtained from the burning step.

A fourth aspect of the present invention is a silicon carbide sintered body which is formed by sintering a silicon carbide powder which contains impurity elements, each of the impurity elements being contained in an amount of not more than 0.01 ppm, wherein the silicon carbide powder has an average particle diameter ($D_{50}$) of 1 μm–50 μm, and a value calculated from particle size distribution of a ratio ($D_{90}/D_{10}$) of a 90% cumulative diameter ($D_{90}$) to a 10% cumulative diameter ($D_{10}$) is not more than 5.0.

The silicon carbide powder of the present invention is useful as a raw material for the silicon carbide sintered body. In particular, the silicon carbide sintered body obtained from the silicon carbide powder of the present invention can be highly purified, and is suitable for use for semiconductor-related components.

In the production method of the silicon carbide sintered body of the present invention, because the silicon carbide powder obtained in the burning is heat-treated, impurities adhered at a surface of the powder and at a vicinity of the surface can be removed. As a result, high purity silicon carbide powder can be obtained.

DESCRIPTION OF THE PREFERRED EMBODIMENTS

The present invention is described more specifically below.

A silicon carbide powder of the present invention contains impurity elements, each of the impurity elements being contained in an amount of at most 0.01 ppm. Thus, a high purity silicon carbide sintered body can be obtained by using this silicon carbide powder.

The amount of each impurity element can be measured using an ICP-mass spectrometer or a flameless atomic absorption spectrometer.

The term "impurity element" means an element which belongs to one of groups 1 to 16 of the periodic table of the 1989 revised version of IUPAC inorganic chemistry nomenclature and which has an atomic number of at least 3, excepting atomic numbers 6 to 8 and 14.

Preferably, the silicon carbide powder of the present invention has an average particle diameter ($D_{50}$) of 1 μm–50 μm and a value of a ratio ($D_{90}/D_{10}$) of a 90% cumulative diameter ($D_{90}$) to a 10% cumulative diameter ($D_{10}$), which are calculated from particle size distribution, is at most 5.0.

The average particle diameter ($D_{50}$) is preferably 1 μm–50 μm, and more preferably 1 μm–40 μm. If the average particle diameter ($D_{50}$) is less than 1 μm, handling in processes of measuring, mixing and the like may become difficult. If the average particle diameter ($D_{50}$) exceeds 50 μm, specific surface area of the powder becomes small; i.e., contact surface areas between particles become small and densification of the silicon carbide sintered body may become difficult.

The value of the ratio ($D_{90}/D_{10}$) of the 90% cumulative diameter ($D_{90}$) to the 10% cumulative diameter ($D_{10}$), calculated from the particle size distribution, is preferably at most 5.0. If the value of ($D_{90}/D_{10}$) exceeds 5.0, the particle size distribution will be wide. Thus, many particles which are larger or smaller than a suitable average particle diameter will be mixed in and, however particle diameters are biased, particle diameters may be irregular.

The silicon carbide powder of the present invention can be preferably obtained by the following production method of silicon carbide powder of the present invention.

The production method of the silicon carbide powder of the present invention is described in detail herebelow.

The production method of the silicon carbide powder of the present invention includes a burning step in which a silicon-containing compound and a carbon-containing compound are burned in an inert atmosphere, and a heat treatment step in which the silicon carbide powder obtained in the burning is heat-treated in a vacuum atmosphere. By means of the production method of silicon carbide powder of the present invention, a high purity silicon carbide powder, such as the silicon carbide powder of the present invention, can be obtained.

The burning step is described in detail herebelow.

In the burning step, with regard to obtaining silicon carbide powder having uniform particle diameters, detecting amounts of carbon monoxide generated in the burning and controlling adjustment of burning temperature in accordance with the detected amounts is preferable.

In the burning step, generally, when at least two compounds which react while generating gas when heated (shown as compound AB (solid) and compound CD (solid) below) are heated, a reaction as shown in the reaction formula model below is caused. As a result, a specified substance, particulate compound AC, is obtained and, depending on the reaction, gas compound BD is produced as a by-product.
(Reaction formula model)

AB (solid)+CD (solid)→AC (solid)+BD (gas)

In investigations by the inventors of the present invention, it was found that, if raw material compounds AB and CD are burned and reacted in an inert atmosphere and amounts of gas generated in burning are detected, there is a correlation between an amount of gas generated and a state of progress of the reaction.

In other words, the amount of gas generated varies depending upon progress of the reaction. In an initial stage of the reaction, a medium amount of gas is generated; in a middle stage of the reaction, a large amount of gas is generated; and in a final stage of the reaction, a medium amount of gas is generated. Further, in a particle diameter growth stage of a target compound AC, a small amount of gas is generated. At this time, the reaction of the two compounds has completed. Thus, starting to decrease the temperature of the reaction system is preferable, so as to prevent rapid growth of the particles in the particle diameter growth stage of the obtained target compound AC.

It is known that the following reaction proceeds when the above-described reaction formula model is applied to the burning step:

$SiO_2 + 3C \rightarrow SiC + 2CO$ (gas)

However, in practice, the reaction does not proceed in such an ideal manner. From analysis of by-products, the following reactions are thought to proceed simultaneously:

$SiO_2 + C \rightarrow SiO$ (gas) + CO (gas)

$SiO + C \rightarrow Si + CO$ (gas)

$Si + C \rightarrow SiC$

To detect the amount of gas generated by the reaction, a pressure sensor is disposed in a chamber where the reaction is conducted, in order to maintain pressure in the chamber. Gas generated by the reaction is emitted by a solenoid valve. The amount of gas generated may be calculated from an amount of gas emitted from the solenoid valve (an amount of decompression per unit time).

SiO gas generated in this reaction process includes large amounts of impurities, and solidifies below a temperature of 1,700° C. to become a by-product. Therefore, as previously suggested by the applicant of the present application in Japanese Patent Application Laid-Open (JP-A) No. 11-106212, it is preferable, with regard to purification, if all of the SiO (gas) is recovered by a recovering device which has a cooling mechanism. In the method described in JP-A-11-106212, gas generated in a heating furnace is cooled by a cooling device such that SiO (gas) is hardened to a solid state, and then the solid is filtered by a filter. Accordingly, all of the SiO (gas) is filtered. Thus, an amount of gas after the SiO has been filtered and recovered is an amount of CO (gas) generated.

The amounts of CO generated from the beginning of the reaction (the beginning of burning) to the end thereof and preferable temperature control will now be described specifically.

After the beginning of burning (heating), when the amount of CO generated is 0.1–50 liter/min per 1 kg of raw material, the reaction is in the initial stage, and heating and a temperature increase are needed. The rate of temperature increase is preferably 0.1–15° C./min, and more preferably 2–8° C./min.

As the reaction proceeds, when the amount of CO generated exceeds 50 liter/min per 1 kg of raw material, the reaction is shown to be in the middle stage. In the middle stage, the rate of heating and temperature increase is preferably 0.1–15° C./min, and more preferably 2–8° C./min. At this time, a final heating temperature is around 1,600–2,000° C.

Subsequently, when the amount of CO generated falls below 10 liter/min per 1 kg of raw material, the reaction is shown to be in the final stage. At this time, the heating temperature is not increased but is held constant at a fixed level around 1,600–2,000° C.

As time passes, the amount of CO generated decreases. When the amount of CO generated falls below 1.0 liter/min per 1 kg of raw material, the reaction is almost completed. At this time, the particle diameter growth stage begins. Thus, the temperature of the system needs to be decreased and is cooled at a rate of temperature decrease of 1–50° C./min. A cooling rate is preferably a rate of temperature decrease of 5–30° C./min, and more preferably 10–20° C./min.

Rates of temperature increase and decrease at this time are very important. For example, if the temperature is decreased rapidly when the particle diameter growth stage has begun, there is a risk of damage to the apparatus. On the other hand, if the temperature is decreased more slowly, the particles will continue to grow, large particles will be formed, and particle diameters will be irregular in accordance with the temperature imbalance, which is not preferable.

Raw materials and detailed reaction conditions of the burning step are specifically described below.

In the burning step, suitably, the silicon-containing compound is a silicon source including at least one liquid silicon compound, the carbon-containing compound is a carbon source including at least one liquid organic compound that generates carbon when heated, and these sources are burned together with one of a polymerization catalyst and a crosslinking catalyst added. Specifically, dissolving the silicon source including at least one liquid silicon compound (hereinafter referred to as the silicon source where appropriate), the carbon source including at least one liquid organic compound that generates carbon when heated (hereinafter referred to as the carbon source where appropriate), and the polymerization or crosslinking catalyst in a solvent, drying the obtained solution, and then burning the obtained powder in a non-oxidizing atmosphere is suitable.

A combination of liquid silicon compounds and solid silicon compounds can be used as the silicon source. Preferably, the silicon source includes at least one liquid silicon compound. (Mono-, di-, tri-, tetra-) alkoxysilanes and polymers of tetraalkoxysilanes can be used as the liquid silicon compound. Of the alkoxysilanes, tetraalkoxysilanes are suitably used, and specific examples thereof include methoxysilane, ethoxysilane, propoxysilane, butoxysilane and the like. In terms of handling, ethoxysilane is preferable. Examples of polymers of tetraalkoxysilanes include low molecular weight polymers with a polymerization degree of about 2–15 (oligomers) and liquid polymers of silicic acid with higher polymerization degrees. Examples of solid silicon compounds which can be used in combination with the above compounds include silicon oxides. In the present invention, silicon oxides include, in addition to SiO, silica sol (such as a liquid including hyperfine colloidal silica, which includes OH groups and alkoxyl groups therein), silicon dioxide (such as silica gel, fine silica, and quartz powder) and the like. The above silicon sources may be used singly or in a combination of two or more.

Of the above silicon sources, in terms of homogeneity and handling, oligomers of tetraethoxysilane, mixtures of an oligomer of tetraethoxysilane with fine powder of silica, and the like are suitable. Preferably, a silicon source with high purity is used and the amount of each initial impurity element contained therein is at most 0.01 ppm.

A combination of liquid organic compounds which generate carbon when heated and solid organic compounds can be used as the carbon source. Preferably, the carbon source includes at least one liquid organic compound. The carbon source is preferably an organic compound which has a high actual carbon ratio and which is polymerized or crosslinked when catalyzed or heated. Specific preferable examples include monomers and prepolymers of resins such as phenol resin, furan resin, polyimide, polyurethane, polyvinyl alcohol and the like, and also liquids such as cellulose, sucrose, pitch, tar and the like. A resol type phenol resin is especially preferable. The above carbon sources may be used singly or in a combination of two or more. Preferably, a carbon source with high purity is used, and the amount of each initial impurity element contained therein is at most 0.01 ppm.

The polymerization or crosslinking catalyst can be selected as appropriate for the carbon source. Examples thereof, if the carbon source is phenol resin or furan resin, include acids such as toluenesulfonic acid, toluenecarboxylic acid, acetic acid, oxalic acid, sulfuric acid and the like. Of these acids, toluenesulfonic acid is suitably used.

A ratio of carbon to silicon (hereinafter abbreviated as a C/Si ratio) in the burning step is determined by subjecting an intermediate carbide, which is obtained by carbonizing the mixture at 1,000° C., to elemental analysis. In stoichiometric terms, if the C/Si ratio is 3.0, free carbon content of the produced silicon carbide should be 0%. However, in practice free carbon will be generated at a lower C/Si ratio, because SiO gas that is generated simultaneously evaporates. Determining composition in advance, such that an amount of free carbon in the produced silicon carbide powder is not an unsuitable amount for applications such as producing a sintered body, is important. Generally, when burning at not less than 1,600° C. at about 1 atm, free carbon can be suppressed when the C/Si ratio is in a range from 2.0 to 2.5. Thus, a C/Si ratio within this range can be favorably used. If the C/Si ratio exceeds 2.5, the amount of free carbon increases remarkably, and the free carbon has an effect of suppressing growth of particles. Accordingly, selection of a C/Si ratio exceeding 2.5 may be suitable, depending on particle formation objectives. When burning in a low pressure or high pressure atmosphere, a C/Si ratio that will provide pure silicon carbide varies. Thus, in such cases the C/Si ratio is not necessarily limited to the above range.

In the burning step, in order to obtain powder by dissolving the silicon source and the carbon source in a solvent and then drying the obtained solution, the mixture of the silicon source and the carbon source may be hardened as appropriate. Examples of the hardening method include a method of crosslinking by heating, a method of hardening by using a hardening catalyst, and a method using one of an electron beam and radiation. The hardening catalyst can be selected as appropriate for the carbon source. If the carbon source is phenol resin or furan resin, acids such as toluenesulfonic acid, toluenecarboxylic acid, acetic acid, oxalic acid, hydrochloric acid, sulfuric acid, maleic acid and the like, amines such as hexamine and the like, and the like are used. A mixture of these catalysts is dissolved or dispersed in a solvent so as to be mixed. Examples of the solvent include lower alcohols (such as ethyl alcohol and the like), ethyl ether, acetone and the like.

The powder obtained by dissolving the silicon source and the carbon source in the solvent and then drying the obtained solution is carbonized by heating. Carbonization is carried out by heating the powder in a non-oxidizing atmosphere, such as nitrogen, argon and the like, at 800–1,000° C. for 30–120 minutes.

The silicon carbide powder is formed by further heating the obtained carbide in a non-oxidizing atmosphere, such as argon and the like, at 1,350–2,000° C. For the sake of efficiency, the final burning temperature at this time is desirably 1,600–2,000° C. However, as described earlier, temperature increases up to the final temperature need to be controlled while amounts of generated gas are observed.

If temperature increases and decreases are controlled while amounts of generated gas are observed in this way, the reaction can proceed efficiently, excessive growth of particle diameters and non-homogeneity of particle diameters, which is caused by non-homogeneity of temperature, can be prevented, and silicon carbide powder having homogeneous particle diameters can be obtained.

The heat treatment step is described in detail herebelow.

The heat treatment step is a step in which the silicon carbide powder obtained in the burning is heat-treated in a vacuum atmosphere.

In the heat treatment step, for the sake of removing impurities, heat treatment is suitably conducted in a vacuum atmosphere of at most 0.1 Torr, and preferably of at most 0.05 Torr. However, in terms of mechanical loads (e.g., more frequent maintenance and the like) and the like, conducting the heat treatment in a vacuum atmosphere below 0.02 Torr is not preferable.

In the heat treatment step, conducting the heat treatment by increasing the temperature up to a maximum processing temperature of 1,800–2,200° C. at a rate of temperature increase of 0.1–50° C./min, holding the temperature at the maximum processing temperature for 5–30 minutes, and then decreasing the temperature is suitable. Further, conducting the heat treatment step after the silicon carbide powder obtained in the burning has been temporarily cooled to room temperature (25–30° C.) is suitable.

In the heat treatment step, for the sake of average particle diameter regularity and productivity, the rate of temperature increase is preferably 0.1–50° C./min, and more preferably 0.5–10° C./min. If the rate of temperature increase is less than 0.1° C./min, productivity may be reduced. If the rate of temperature increase exceeds 50° C./min, there may be large irregularities of average particle diameters.

In the heat treatment step, for the sake of purifying ability (impurity element removing ability), the maximum processing temperature is preferably 1,800–2,200° C., and more preferably 1,800–1,950° C. If the maximum processing temperature is lower than 1,800° C., purifying ability may be reduced. If the maximum processing temperature exceeds 2,200° C., mechanical loads may be too large.

In the heat treatment step, for the sake of purifying ability, a time of holding at the maximum processing temperature is preferably 1–30 minutes. If the time of holding at the maximum processing temperature is outside this range, purifying ability may be reduced.

In the heat treatment step, the temperature decrease may be conducted by natural cooling or by forced cooling.

The heat treatment step may be conducted a plurality of times rather than just once, and high purity silicon carbide powder can be obtained by the heat treatment step. Further, the heat treatment step can promote growth of the particles of the silicon carbide powder. Thus, the particle diameter can be controlled by appropriate selection of the above-mentioned heat treatment conditions and a number of repetitions. For example, the particle diameter can be controlled to reduce scattering and the like, in order to make handling easier.

The production method of silicon carbide powder of the present invention provides high purity silicon carbide powder by going through the burning step and the heat treatment step.

EXAMPLES

The present invention will be described below with specific examples. The present invention is limited by the principles thereof and not by these examples.

Example 1

Production of Silicon Carbide Powder
Burning Step

As raw materials, 3,050 g of ethyl silicate, which is a liquid silicon compound at room temperature, and 1,420 g of a resol type phenol resin, which is an organic compound that generates carbon when heated, were stirred for about 5 minutes with a stirring rate of about 3,000 rpm. Then, as a catalyst, 255 g of a saturated aqueous solution of maleic anhydride (manufactured by Mitsubishi Chemical Corp.) was added to the mixture, which was then further stirred for about 15 minutes with a stirring rate of about 3,000 rpm. Thereafter, a resulting mixture was carbonized for 1 hour at 900° C. in a nitrogen atmosphere to obtain a uniform resinous solid material.

Next, a resulting carbide was disposed in an argon atmosphere, burning was begun, amounts of CO generated during the reaction were continuously calculated from amounts of gas emitted from a solenoid valve and the amounts of CO were recorded.

During burning, that is, after heating had begun, an amount of CO generated was 15 liter/min per 1 kg of raw material. Thus, the reaction was confirmed as being in the initial stage. A rate of temperature increase at this time was set to 5° C./min, and the temperature was increased to 1,800° C.

As the reaction proceeded, amounts of CO generated reached 52 liter/min per 1 kg of raw material. Thus, the reaction was confirmed as being in the middle stage. Heating was set for a rate of temperature increase of 3° C./min, and a final heating temperature of around 1,870° C.

Thereafter, amounts of CO generated fell below 7 liter/min per 1 kg of raw material. Thus, the reaction was confirmed as having entered the final stage. Accordingly, the temperature increase was stopped and the temperature was held constant at around 1,870° C.

After the temperature had been held for 10 minutes, amounts of CO generated had fallen below 1.0 liter/min per 1 kg of raw material. Thus, the reaction was confirmed as being almost completed. Accordingly, the temperature of the system was cooled to 1,200° C. at a rate of temperature decrease of 15° C./min. Thereafter, forced cooling was carried out.

Heat Treatment Step

Heat treatment was performed by increasing the temperature of the silicon carbide powder obtained through the burning step, which had been decreased to room temperature (25° C.), to a maximum processing temperature of 1,850° C. at a rate of temperature increase of 1° C./min in a vacuum atmosphere of 0.1 Torr, holding the temperature at the maximum processing temperature for 10 minutes, and then allowing natural cooling.

The average particle diameter of the silicon carbide powder obtained through the burning step and the heat treatment step was 15.4 $\mu$m, and a value of $D_{90}/D_{10}$, obtained from particle size distribution, was 4.9. Further, the amount of each impurity element therein was measured using an ICP-mass spectrometer. Results are shown in Tables 1 and 2.

Production of Silicon Carbide Sintered Body 50 g of the silicon carbide powder obtained through the burning step and the heat treatment step and 8 g of a resol type phenol resin including an amine (actual carbon ratio after thermal decomposition: 50%) were wet-mixed by a ball mill into 50 g of ethanol solvent. Then, the mixture was dried and molded into a cylindrical shape with a diameter of 20 mm and a thickness of 10 mm. Phenol resin content and amine content of this molded body were 6% by weight and 0.1% by weight, respectively.

The molded body was sintered by hot pressing for 3 hours at a temperature of 2,300° C. in an argon gas atmosphere at a pressure of 700 kgf/cm$^2$, to obtain a silicon carbide sintered body. Physical properties of this silicon carbide sintered body were measured using the following method.

Sintering Characteristic

Density of the sintered body was determined with the Archimedes Method (JIS R1634). A sintering characteristic was calculated from the measured density and a theoretical density using the following formula. If the value is nearer 100, the sintering characteristic is considered to be more excellent.

Sintering characteristic=[density/theoretical density (3.21 g/cm$^3$)]×100%

The obtained value was 98.1%. Thus, the sintering characteristic was shown to be satisfactory. Results are shown in Tables 1 and 2.

Example 2

Silicon carbide powder was produced and evaluated in the same manner as in Example 1, except that in the heat treatment step the rate of temperature increase was 10° C./min and the maximum processing temperature was 2,000° C. Further, a silicon carbide sintered body was produced, using the obtained silicon carbide powder, and evaluated in the same manner as in Example 1. Results are shown in Tables 1 and 2.

Example 3

Silicon carbide powder was produced and evaluated in the same manner as in Example 1, except that in the heat treatment step the rate of temperature increase was 40° C/min and the maximum processing temperature was 2,150° C. Further, a silicon carbide sintered body was produced, using the obtained silicon carbide powder, and evaluated in the same manner as in Example 1. Results are shown in Tables 1 and 2.

Comparative Example 1

Silicon carbide powder was produced and evaluated in the same manner as in Example 1, except that the heat treatment step was not performed. Further, a silicon carbide sintered body was produced, using the obtained silicon carbide powder, and evaluated in the same manner as in Example 1. Results are shown in Tables 1 and 2.

TABLE 1

|  | Heat treatment step | | | Physical properties of silicon carbide powder | | Physical properties of silicon carbide sintered |
| --- | --- | --- | --- | --- | --- | --- |
|  | Rate of temperature increase (° C./min) | Maximum processing temperature (° C.) | Holding time (min) | Average particle diameter (μm) | Value of ($D_{90}$/$D_{10}$) | body Sintering characteristic (%) |
| Example 1 | 1 | 1,850 | 10 | 15.4 | 4.9 | 98 |
| Example 2 | 10 | 2,000 | 8 | 35.0 | 4.1 | 95 |
| Example 3 | 40 | 2,150 | 2 | 32.5 | 4.8 | 96 |
| Comparative Example 1 | — | — | — | 3.4 | 3.9 | 93 |

TABLE 2

| | Impurity content (ppm) | | | |
| --- | --- | --- | --- | --- |
| Impurity element | Example 1 | Example 2 | Example 3 | Comparative Example 1 |
| B | 0.008 | 0.005 | 0.003 | 0.12 |
| Na | <0.001 | <0.001 | <0.001 | 0.055 |
| K | <0.001 | <0.001 | <0.001 | 0.021 |
| Al | 0.002 | 0.004 | 0.008 | 0.11 |
| Cr | 0.002 | <0.001 | 0.001 | 0.023 |
| Fe | <0.001 | 0.002 | 0.005 | 0.08 |
| Ni | 0.002 | 0.003 | 0.002 | 0.09 |
| Cu | 0.006 | 0.008 | 0.007 | 0.064 |
| W | <0.001 | <0.001 | <0.001 | 0.02 |
| Ti | <0.001 | 0.003 | <0.001 | 0.03 |
| Ca | 0.004 | 0.004 | 0.003 | 0.042 |

From Tables 1 and 2, it can be seen that a silicon carbide powder subjected to heat treatment has high purity. It can be seen that silicon carbide powder having uniform particle diameters can be obtained by controlling adjustments of heating temperature in accordance with amounts of carbon monoxide generated during sintering. Further, it can be seen that silicon carbide powder obtained through the sintering step and the heat treatment step as in Examples 1–3 is useful as a raw material for a high purity, high density silicon carbide sintered body, and that a silicon carbide sintered body obtained from this raw material will have high purity and high density.

As described above, in accordance with the present invention, high purity silicon carbide powder which is applicable as a raw material of a high purity, high density silicon carbide sintered body, a production method of the powder, and a silicon carbide sintered body can be provided.

What is claimed is:

1. A silicon carbide powder, which contains impurity elements, all of the impurity elements being contained in an amount of not more than 0.01 ppm each.

2. A silicon carbide powder according to claim 1, which has an average particle diameter ($D_{50}$) of 1 μm–50 μm, and wherein a value calculated from particle size distribution of a ratio ($D_{90}$/$D_{10}$) of a 90% cumulative diameter ($D_{90}$) to a 10% cumulative diameter ($D_{10}$) is not more than 5.0.

3. A silicon carbide powder according to claim 2, wherein said silicon carbide powder is used for a silicon carbide sintered body.

4. A silicon carbide powder according to claim 3, wherein said silicon carbide sintered body is a semiconductor component.

5. A production method of a silicon carbide powder according to claim 1, said method comprising the steps of:
   burning a silicon-containing compound and a carbon-containing compound in an inert atmosphere; and
   heat-treating, in a vacuum atmosphere, a silicon carbide powder which is obtained from the burning step.

6. A production method of silicon carbide powder according to claim 5, wherein, in said burning step, an amount of carbon monoxide generated during burning is detected, and a burning temperature adjustment is controlled in accordance with the amount detected.

7. A production method of silicon carbide powder according to claim 6, wherein control of said burning temperature adjustment is such that: when an amount of the carbon monoxide generated is 0.1–50 liter/min per 1 kg of raw material after commencement of heating, heating is conducted at a rate of temperature increase of 0.1–15° C./min; when an amount of the carbon monoxide generated has exceeded 50 liter/min per 1 kg of raw material, heating is conducted at a rate of temperature increase of 0.1–15° C./min; then, when an amount of the carbon monoxide generated has become not more than 10 liter/min per 1 kg of raw material, temperature increase is not conducted and a heating temperature is held constant; and when said an amount of the carbon monoxide generated has become not more than 1.0 liter/min per 1 kg of raw material, cooling is conducted at a rate of temperature decrease of 1–50° C./min.

8. A production method of silicon carbide powder according to claim 5, wherein, in said burning step, the silicon-containing compound is a silicon source including at least one liquid silicon compound, the carbon-containing compound is a carbon source including at least one liquid organic compound which generates carbon when heated, and said sources are burned together with one of a polymerization catalyst and a crosslinking catalyst.

9. A production method of silicon carbide powder according to claim 5, wherein, in said heat treatment step, heat treatment is conducted in a vacuum atmosphere of not more than 0.1 Torr.

10. A production method of silicon carbide powder according to claim 5, wherein, in said heat treatment step, heat treatment is conducted by increasing temperature to a maximum processing temperature which is in a range from 1,800 to 2,200° C. at a rate of temperature increase of 0.1–50° C./min, then holding the temperature at the maximum processing temperature for 5–30 minutes, and then decreasing the temperature.

11. A production method of silicon carbide powder according to claim 5, wherein, after the silicon carbide powder which was obtained from said burning step has been cooled to room temperature, said heat treatment step is conducted.

12. A silicon carbide powder according to claim 1, said powder being produced by a method comprising the steps of:
burning a silicon-containing compound and a carbon-containing compound in an inert atmosphere; and
heat-treating, in a vacuum atmosphere, a silicon carbide powder which is obtained from the burning step.

13. A silicon carbide powder according to claim 12, wherein, in said burning step, an amount of carbon monoxide generated during burning is detected, and a burning temperature adjustment is controlled in accordance with the amount detected.

14. A silicon carbide powder according to claim 13, wherein control of said burning temperature adjustment is such that: when an amount of the carbon monoxide generated is 0.1–50 liter/min per 1 kg of raw material after commencement of heating, heating is conducted at a rate of temperature increase of 0.1–15° C./min; when an amount of the carbon monoxide generated has exceeded 50 liter/min per 1 kg of raw material, heating is conducted at a rate of temperature increase of 0.1–15° C./min; then, when an amount of the carbon monoxide generated has become not more than 10 liter/min per 1 kg of raw material, temperature increase is not conducted and a heating temperature is held constant; and when said an amount of the carbon monoxide generated has become not more than 1.0 liter/min per 1 kg of raw material, cooling is conducted at a rate of temperature decrease of 1–50° C./min.

15. A silicon carbide powder according to claim 12, wherein, in said burning step, the silicon-containing compound is a silicon source including at least one liquid silicon compound, the carbon-containing compound is a carbon source including at least one liquid organic compound which generates carbon when heated, and said sources are burned together with one of a polymerization catalyst and a crosslinking catalyst.

16. A silicon carbide powder according to claim 12, wherein, in said heat treatment step, heat treatment is conducted in a vacuum atmosphere of not more than 0.1 Torr.

17. A silicon carbide powder according to claim 12, wherein, in said heat treatment step, heat treatment is conducted by increasing temperature to a maximum processing temperature which is in a range from 1,800 to 2,200° C. at a rate of temperature increase of 0.1–50° C./min, then holding the temperature at the maximum processing temperature for 5–30 minutes, and then decreasing the temperature.

18. A silicon carbide powder according to claim 12, wherein, after the silicon carbide powder which was obtained from said burning step has been cooled to room temperature, said heat treatment step is conducted.

19. A silicon carbide sintered body which is formed by sintering a silicon carbide powder which contains impurity elements, each of the impurity elements being contained in an amount of not more than 0.01 ppm, wherein the silicon carbide powder has an average particle diameter ($D_{50}$) of 1 μm–50 μm, and a value calculated from particle size distribution of a ratio ($D_{90}/D_{10}$) of a 90% cumulative diameter ($D_{90}$) to a 10% cumulative diameter ($D_{10}$) is not more than 5.0.

20. A silicon carbide sintered body according to claim 19, wherein the silicon carbide sintered body is formed by sintering a silicon carbide powder produced by a method comprising the steps of:
burning a silicon-containing compound and a carbon-containing compound in an inert atmosphere; and
heat-treating, in a vacuum atmosphere, a silicon carbide powder which is obtained from the burning step.

* * * * *